United States Patent Office 3,839,388
Patented Oct. 1, 1974

3,839,388
PROCESS FOR THE CONDENSATION AND/OR EQUILIBRATION OF ORGANOSILICON COMPOUNDS
Siegfried Nitzsche, Wolfgang Hechtl, and Ernst Wohlfarth, Burghausen, Germany, assignors to Wacker-Chemie G.m.b.H., Munich, Germany
No Drawing. Filed June 8, 1973, Ser. No. 368,428
Claims priority, application Germany, June 16, 1972, P 22 29 514.3
Int. Cl. C07f 7/08
U.S. Cl. 260—448.2 E          7 Claims

ABSTRACT OF THE DISCLOSURE

A continuous process for the condensation and/or equilibration of organosilicon compounds containing an oxygen atom which comprises mixing an organosilicon compound with a phosphonitrilic chloride solution, which is obtained from the reaction of two moles of phosphorous pentachloride and one mole of ammonium chloride.

---

This invention relates to a process for the condensation and/or equilibration of organosilicon compounds, particularly to an improved process for the condensation and/or equilibration of organo-silicon compounds containing Si-bonded oxygen atoms. More particularly the present invention relates to an improved process for the condensation and/or equilibration of organosilicon compounds in the presence of a certain phosphonitrilic chloride catalyst.

Heretofore, it was known that condensation and/or equilibration reactions of organosilicon compounds containing Si-bonded oxygen atoms can be catalyzed with phosphorous-nitrogen compounds (see e.g., German Pat. 930,481). Among the phosphorous-nitrogen compounds which have been used are the phosphorous chloronitriles, often referred to as "phosphonitrilic chlorides." Generally, these phosphonitrilic chlorides are dissolved in an organic solvent and then mixed with the compounds whose reaction is to be catalyzed.

Due to the increased demand for organopolysilixane products, it is desirable to carry out the condensation and/or equilibrium reactions of the organosilicon compounds containing Si-bonded oxygen atoms, in a continuous process. Likewise, in the manufacture of uniform products, it is often desirable to mix the compounds, whose reaction is to be catalyzed, with a phosphonitrilic chloride solution in a continuous manner. Where the condensation and/or equilibration is conducted as a batch process, the phosphonitrilic chloride solutions, whose manufacture is described, for example, in DT-AS 1,262,020, was entirely satisfactory. However, when this solution is employed in a continuous process, certain disadvantages are apparent. For example, precipitation of the phosphonitrilic chloride results in the formation of deposits in the metering pumps and in the conduits connected to the metering pumps, thereby causing the valves of the metering pumps to remain open and the conduits connected to the metering pumps to become clogged.

In contrast to phosphonitrilic chlorides used heretofore, the phosphonitrilic chloride of this invention does not form a precipitate when dissolved in an organic solvent. In addition, the phosphonitrilic chloride employed in accordance with this invention is more than twice as active in promoting the condensation and/or equilibration of organosilicon compounds than the phosphonitrilic chlorides used heretofore. Furthermore, due to the increased effectiveness of the phosphonitrilic chloride of this invention, only about one-half of the amount generally required for the condensation and/or equilibration of the organosilicon compounds need be employed in the present invention. Likewise, the amount of neutralizing agent, such as tributylamine, required for the neutralization of the phosphonitrilic chloride is reduced accordingly.

Therefore, it is an object of this invention to provide an improved process for the condensation and/or equilibration of organosilicon compounds having Si-bonded oxygen atoms. Another object of this invention is to provide a catalyst which may be used in a continuous process for the preparation of organopolysiloxanes. A further object of this invention is to provide a phosphonitrilic chloride catalyst which does not form a precipitate in organic solvents. A still further object of this invention is to provide a phosphonitrilic chloride catalyst for the condensation and/or equilibration of organosilicon compounds which has increased activity.

The foregoing objects and others which will become apparent from the following description are accomplished in accordance with this invention, generally speaking, by providing a continuous process for the condensation and/or equilibration of organosilicon compounds containing Si-bonded oxygen atoms which comprises mixing the organosilicon compounds with a phosphonitrilic chloride solution obtained from the reaction of two moles of phosphorous pentachloride with one mole of ammonium chloride.

The condensation reactions of organosilicon compounds having Si-bonded oxygen atoms consists essentially of the reaction of two Si-bonded hydroxyl groups with the elimination of water; as well as, for example, the reaction of Si-bonded hydroxyl groups with Si-bonded alkoxy groups with the elimination of alcohol or with Si-bonded halides with the elimination of hydrogen halides. The term "equilibration" refers to the rearrangement of siloxane compounds until a balance in the arrangement of siloxane units is attained. Condensation and equilibration reactions often take place simultaneously. A prerequisite for the effectiveness of phosphonitrilic chlorides during equilibration reactions is the presence of Si-bonded hydroxyl groups or hydrogen halide or easily hydrolyzable halides, such as, for example, methylchlorosilanes.

The organosilicon compounds containing Si-bonded oxygen atoms which can be employed within the scope of the invention comprise all those whose condensation and/or equilibration reactions could heretofore be catalyzed by means of known phosphonitrilic chlorides or by other phosphorous-nitrogen compounds.

The phosphonitrilic chlorides of this invention may be used in the condensation and/or equilibration of silicon compounds containing only Si-bonded oxygen atoms; preferably linear or essentially linear diorganopolysiloxanes having Si-bonded hydroxyl groups and/or diorganosilandiols or mixtures of these silicon compounds with cyclic diorganopolysiloxanes and/or hexaorganodisiloxanes and/or diorganopolysiloxanes which are end-blocked with triorganosiloxy groups. Thus the process of this invention is preferably used in the production of high molecular weight organopolysiloxanes from low molecular diorganopolysiloxanes. Also the process of this invention is particularly applicable for the production of high molecular weight diorganopolysiloxanes or oils, especially high molecular weight, triorganosiloxy end-blocked organopolysiloxanes which may be used in the manufacture of organopolysiloxane elastomers, as disclosed in German patents and publications, DT–PS 930,481, DT–AS 1,167,-534, DT–AS 1,246,253, DT–AS 1,262,020, DT–OS 1,964,625 and British Pat. 1,226,495.

Also the phosphonitrilic chlorides of this invention may be used with organosilicon compounds containing oxygen atom in admixture with other silicon compounds having oxygen atoms, especially silicon dioxide having a surface of at least 50 m.²/g., as described in DT–AS 1,208,492 and DT–AS 1,212,727. Likewise, the phosphonitrilic chlorides may be used in admixture with organosilicon compounds in which some of the organosilicon compounds contained oxygen atoms and some of the organosilicon compounds are free of Si-bonded oxygen atoms such as trimethyl-chlorosilane (see DT–AS 1,279,019). Among the organosilicon compounds having Si-bonded oxygen atoms which may be used, are mixtures of linear or essentially, linear diorganopolysiloxanes having Si-bonded hydroxyl groups and/or diorganosilandiols and, if desired, cyclic diorganopolysiloxanes and hydrocarbonoxysilanes, such as methyltriethoxysilane (see DT–AS 1,221,020). Other organosilicon compounds having Si-bonded oxygen atoms which may be used are mixtures of linear or mostly linear diorganosiloxanes with Si-bonded hydroxyl groups and/or diorganosilandiols in combination with cyclic diorganopolysiloxanes and/or polycyclic organopolysiloxanes, as per DT–AS 1,794,219 and DT–OS 1,955,514.

Organosilicon compounds and other silicon compounds which may be used within the scope of the invention are generally known and not limited to those mentioned in the above-cited literature. The most important organosilicon compounds which may be used within the scope of the invention may be illustrated by the following formulae:

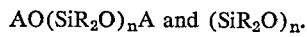

In the above formulae, R represents a monovalent hydrocarbon radical or a substituted monovalent hydrocarbon radical having up to 18 carbon atoms, A represents hydrogen or the —SiR3 groups, where R has the same meaning as above, $n$ represents a whole number with a value of at least 1 and $n'$ a whole number with a value from 3 to 7. Although it is not shown in the above formulae, up to 5 mole percent of the diorganosiloxane units can be substituted by other siloxane units such as monoorgano and/or $SiO_{4/2}$ units. Generally these are present as impurities.

Examples of monovalent hydrocarbon radicals represented by R are alkyl radicals, such as the methyl, n-butyl and the sec.-butyl, octyl and octoate radicals; alkenyl radicals such as the vinyl radicals and aryl radicals such as the phenyl radical.

Examples of substituted monovalent hydrocarbon radicals represented by R are cyanoalkyl radicals, such as the beta-cyanoalkyl radical; alkyl halide radicals such as the 3,3,3-trifluororopyl radicals and aryl halide radicals such as O-, m- and p-chlorophenyl radicals.

Because of their availability, it is preferred that at least 80 percent of the R radicals be methyl radicals and the remaining R radicals, if any, are preferably vinyl- and/or phenyl radicals.

The viscosity of the organopolysiloxanes employed in the process of this invention is generally from about 30 to 1000 cp. at 25° C. Organopolysiloxanes having this viscosity range and corresponding to the above shown formulae, where A is hydrogen, are generally obtained as direct products from the hydrolysis of the corresponding organochlorosilanes, e.g., dimethylidichlorosiliane.

The radical represented by R above is also applicable to the Si-C-bonded organic radicals of the other organosilicon compounds which may be employed in the process of this invention.

The phosphonitrilic chloride obtained from the reaction of two moles of phosphorous pentachloride and one mole ammonium chloride until the formation of hydrochloric acid has terminated, may be represented by the formula:

If the P/N ratio is lower than indicated in this formula, a precipitate is formed, which was one of the problems with the phosphonitrilic chloride solutions used heretofore in catalyzing the condensation and/or equilibration reactions in organosilcion compounds. If, however, the P/N rato is higher, as in the case of the compound

then the phosphonitrilic chlorides are so easily hydrolyzable that they cannot be handled under the prevailing plant conditions without causing serious problems.

The reaction of two moles of phosphorous pentachloride with one mole ammonium chloride may be carried out preferably within the range of 120° C. to 170° C. in a halogenated solvent which is liquid at ambient temperature and at 760 mm. Hg (absolute) such as tetrachloroethane, chloroform, methylene chloride or mixtures of these solvents. This process reduces or substantially curtails the formation of the less effective cyclic phosphonitrilic chlorides.

It is preferred that the reaction of two moles of phosphorous pentachloride with one mole of ammonium chloride be carried out at atmospheric pressure, i.e., at 760 mm. Hg (absolute). If desired, other pressures, especially higher pressures, may also be used.

The solvents employed in the phosphonitrilic chloride solutions of this invention are preferably halogenated hydrocarbons which are liquids at ambient temperature and at 760 mm. Hg (absolute), such as tetrachloroethane, chloroform, methylene chloride or mixtures of such solvents.

The phosphonitrilic chloride content of the phosphonitrilic chloride solutions employed pursuant to this invention, is in the range of from about 0.5 to 50 percent by weight and more preferably from 1 to 35 percent by weight based on the volume of the solution.

The solutions may contain from 0.001 to 1 percent by weight, preferably from 0.003 to 0.05 percent by weight of phosphonitrilic chloride based on the total weight of the silicon compounds.

Generally, the condensation and/or equilibration reactions are conducted at temperatures of from about 20° C. to about 160° C. and more preferably from about 80° C. to about 150° C.

The condensation and/or equilibration reactions can be carried out at the pressure of the surrounding atmosphere, i.e., at 760 mm. Hg (absolute) or at higher or lower pressures. Lower pressures are preferred, since they enhance the removal of the reaction product, especially of water and thus accelerate the condensation reaction.

The phosphonitrilic chloride catalyst of this invention may be neutralized in accordance with German publication DT–AS 1,262,020 in which the product is treated with 1 to 1.5 gram-mol of tertiary amines, such as tributylamine, for each gram equivalent of chlorines. This provides for the production of diorganopolysiloxanes having a uniform degree of viscosity during storage, even though they are not end-blocked by triorganosiloxy groups.

In the continuous condensation and/or equilibrium reactions of this invention, low molecular weight and thus low viscosity diorganopolysiloxanes having Si-bonded hydroxyl groups and, if desired, cyclic diorganopolysiloxanes and/or hexaorganodisiloxanes and/or low molecular weight triorganosiloxy end-blocked diorganopolysiloxanes and the phosphonitrilic chloride solution are supplied continuously and simultaneously to a device which can be heated and evacuated and contains a conveying and kneading or mixing screw, such as a twin-screwed kneader. The phosphonitrilic chloride may be added with a metering pump. If necessary a mixing turbine can be inserted in the process. When the desired viscosity has been achieved, which corresponds to a higher molecular weight diorganopolysiloxane, a tertiary amine solution can be added to the more highly viscous diorganopolysiloxane to neutralize the phosphonitrilic chloride catalyst. The greater the amount of phosphonitrilic chloride, the higher the reaction temperature, the lower the pressure, the more rapid the condensation and/or equilibration reactions and thus the shorter the contact time. In essence this means that the reaction zone in the conveying and kneading or mixing-screw can also be shorter and still produce diorganopolysiloxanes having Si-bonded hydroxyl groups with the desired viscosity. The same applies to diorganopolysiloxanes which are end-blocked with triorganosiloxy groups.

The phosphonitrilic chloride employed in the following examples pursuant to this invention is produced in the following manner. All parts are by weight unless otherwise specified.

A mixture of 417 grams (2 moles) of phosphorous pentachloride and 53.5 grams (1 mole) of ammonium chloride in 1,000 milliliters of tetrachloroethane is boiled for about 12 hours under reflux in an oil bath at a temperature of about 160° C. The volatile components are removed from the thus-obtained light yellow solution at 160° C., while the pressure is lowered to approximately 1 mm. Hg (absolute). The residue which consists of yellow crystals, corresponds to the formula

Cyclic phosphonitrilic chlorides cannot be extracted with petroleum ether.

EXAMPLE 1

(a) A hydroxyl end-blocked dimethylpolysiloxane having a viscosity of 97 cp. at 25° C. is added to a twin-screw kneader maintained at 145° C. and at 60 mm. Hg (absolute) and having a reaction zone of about 132 cm. in length. For each 100 liters of the dimethylpolysiloxane, about 35 milliliters of a solution of phosphonitrilic chloride prepared above in methylene chloride, is added to the twin-screw kneader. The phosphonitrilic chloride solution contains 10 grams of phosphonitrilic chloride per liter. After a contact time of about 2 minutes, the dimethylpolysiloxane has a viscosity of about 78,000 cp. at 25° C. After it leaves the heated reaction zone, each 100 liters of the dimethylpolysiloxane is mixed with 52.5 milliliters of a solution of tri-n-butylamine in toluene which contains 10 grams of tri-n-butylamine per liter. After one month of continuous operation, the amount of precipitated phosphonitrilic chloride is negligible.

(b) The process described in (a) above is repeated for comparison purposes, except that the phosphonitrilic chloride in methylene chloride is obtained by heating 400 grams of phosphorous pentachloride with 130 grams of ammonium chloride in 1,000 milliliters of tetrachloroethane at a temperature of about 135° C. until the development of gas stopped and the solvent was distilled (see DT-AS 1,262,020). This solution also contained 10 grams of phosphonitrilic chloride per liter. Under the same conditions of temperature, pressure and time, 73 milliliters of phosphonitrilic chloride solution are required for each 100 liters of dimenthylpolysiloxane in order to obtain an organopolysiloxane having a viscosity of 78,000 cp. at 25° C. A correspondingly greater amount of the tributylamine solution, namely 109.5 milliliters are required to neutralize the phosphonitrilic chloride per 100 liters of dimethylpolysiloxane. After only one day the valves of the metering pump did not close satisfactorily, due to the formation of a precipitate.

EXAMPLE 2

A mixture containing 11 parts by weight of a hydroxyl end-blocked dimethylpolysiloxane having a viscosity of 102 cp. at 25° C. and 3 parts by weight of a dimethylpolysiloxane having a viscosity of 99 cp. at 25° C. which is end-blocked with vinyldimethylsiloxy groups and a solution of phosphonitrilic chloride in tetrachlorethane, is continuously introduced into a twin-screw kneader maintained at a temperature of about 145° C. and at a pressure of about 11 mm. Hg (absolute) and having a reaction zone of about 132 cm. in length. The solution which contains 13 grams of phosphonitrilic chloride per liter is added at the rate of about 104 milliliters per 100 liters of the organopolysiloxane mixture. After a contact time of 3 minutes, a dimethylpolysiloxane which is end-blocked with vinyldimethylsiloxy groups and having a viscosity of 7,000 cp. at 25° C. is obtained. After the dimethylpolysiloxane leaves the heated reaction zone, it is mixed with 156 milliliters for each 100 liters of polymer of a solution of tri-n-butylamine in toluene. The tri-n-butylamine solution contains 13 grams of tri-n-butylamine per liter. After one month of continuous operation the amount of precipitated phosphonitrilic chloride is negligible.

Although specific examples of the invention have been described herein, it is not intended to limit the invention solely thereto, but to include all variations and modifications falling within the spiirt and scope of the appended claims.

What is claimed is:

1. An improved process for preparing high molecular weight organopolysiloxanes by mixing organosilicon compounds selected from the group consisting of diorganopolysiloxanes having Si-bonded hydroxyl groups, diorganosilanols, triorganosiloxy end-blocked diorganopolysiloxanes, cyclic diorganopolysiloxanes, hydrocarbonoxy silanes and organosilanes containing hydrolyzable halides, with a phosphonitrilic chloride solution, the improvement which comprises continuously mixing the organosilicon compounds with a phosphonitrilic chloride solution obtained from the reaction of two moles of phosphorous pentachloride and one mole of ammonium chloride until the formation of hydrochloric acid has terminated.

2. The imprved process of Claim 1 wherein the phosphonitrilic chloride has the formula

3. The improved process of Claim 1 wherein the organosilicon compounds are mixed with the phosphonitrilic chloride solution at a temperature of from 20° C. to 160° C.

4. The improved process of Claim 1 wherein the phosphonitrilic chloride solution contains from 0.5 to 50 percent by weight based on the volume of the solution of phosphonitrilic chloride.

5. The improved process of Claim 1 wherein the amount of phosphonitrilic chloride present in the mixture is from 0.001 to 1 percent by weight based on the total weight of the silicon compounds.

6. The improved process of Claim 1, wherein the organosilicon compound is represented by the formula $AO(SiR_2O)_nA$ in which R is selected from the group consisting of monovalent hydrocarbon radicals, halogenated monovalent hydrocarbon radicals and cyanoalkyl radicals, A is selected from the group consisting of hydrogen and a radical of the formula $-SiR_3$, and $n$ is a number having a value of at least 1.

7. The improved process of Claim 1, wherein the organosilicon compound is represented by the formula $(SiR_2O)_n$, in which R is selected from the group consisting of monovalent hydrocarbon radicals, halogenated monovalent hydrocarbon radicals and cyanoalkyl radicals and $n'$ is a number from 3 to 7.

References Cited

UNITED STATES PATENTS

| 3,186,967 | 6/1965 | Nitzsche et al. | 260—46.5 R |
| 3,398,117 | 8/1968 | Baronnier et al. | 260—46.5 R |
| 3,398,118 | 8/1968 | Baronnier et al. | 260—46.5 R |
| 3,280,096 | 10/1966 | MacKenzie | 260—448.2 E X |
| 3,271,359 | 9/1966 | Bluestein | 260—46.5 R |

DANIEL E. WYMAN, Primary Examiner

P. F. SHAVER, Assistant Examiner

U.S. Cl. X.R.

260—46.5 G, 46.5 R, 448.8 R